(12) United States Patent  (10) Patent No.: US 12,289,300 B2
Steffen et al.  (45) Date of Patent: *Apr. 29, 2025

(54) SECURE PAIRING OF DEVICES (71) Applicant: International Business Machines Corporation, Armonk, NY (US)

(72) Inventors: Christopher Steffen, Rochester, MN (US); Chad Albertson, Rochester, MN (US); Nicholas Ollerich, Rochester, MN (US); Eric J. Campbell, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,956

(22) Filed: Dec. 14, 2023

(65) Prior Publication Data

US 2024/0163266 A1 May 16, 2024

Related U.S. Application Data (63) Continuation of application No. 18/149,218, filed on Jan. 3, 2023, now Pat. No. 11,902,263, which is a (Continued)

(51) Int. Cl.
*H04L 9/40* (2022.01)
*H04L 9/08* (2006.01)

(52) U.S. Cl.
CPC ........ *H04L 63/0442* (2013.01); *H04L 9/0866* (2013.01); *H04L 9/0897* (2013.01); *H04L 63/0876* (2013.01)

(58) Field of Classification Search
CPC ............ H04L 63/0442; H04L 63/0876; H04L 9/0866; H04L 9/0897
(Continued)

(56) References Cited

U.S. PATENT DOCUMENTS 7,234,058 B1 6/2007 Baugher
8,806,609 B2 8/2014 Gladstone
(Continued)

FOREIGN PATENT DOCUMENTS

CN 106411504 A 10/2020
CN 107579815 A 11/2020
(Continued)

OTHER PUBLICATIONS

List of IBM Patents or Patent Applications Treated as Related (signed 2023) 2 pages.
(Continued)

*Primary Examiner* — Michael S McNally
(74) *Attorney, Agent, or Firm* — Scott Dobson (57) ABSTRACT A system and method for pairing two devices for secure communications. A user selects a first device to pair with a second device. The first and second devices have the ability to securely communicate with each other through the use of encrypted communications. An encryption key is written to the first device and then burned into the encryption module on the first device. A third device is selected to pair with the first device. A second encryption key is written to the first device and then burned into the encryption module.

18 Claims, 4 Drawing Sheets

Related U.S. Application Data continuation of application No. 16/919,489, filed on Jul. 2, 2020, now Pat. No. 11,570,156.

(58) Field of Classification Search
USPC .......................................................... 713/171
See application file for complete search history.

(56) References Cited

U.S. PATENT DOCUMENTS

| | | | |
|---|---|---|---|
| 9,092,969 | B2 | 7/2015 | McCown |
| 9,674,162 | B1 | 6/2017 | Miller |
| 9,923,755 | B2 | 3/2018 | Gulati |
| 10,154,013 | B1 | 12/2018 | Miller |
| 2006/0020784 | A1* | 1/2006 | Jonker ............. H04N 21/43615 713/157 |
| 2007/0024316 | A1 | 2/2007 | Dellow |
| 2008/0077795 | A1 | 3/2008 | MacMillan |
| 2008/0175381 | A1 | 7/2008 | Drehmel |
| 2011/0087898 | A1 | 4/2011 | Williams |
| 2012/0179517 | A1 | 7/2012 | Tang |
| 2014/0176395 | A1* | 6/2014 | White ................ G06F 16/9554 345/2.2 |
| 2014/0292526 | A1 | 10/2014 | Hansson |
| 2015/0074427 | A1 | 3/2015 | Lewis |
| 2015/0293857 | A1 | 10/2015 | Cope |
| 2015/0318874 | A1 | 11/2015 | Donaldson |
| 2016/0085960 | A1* | 3/2016 | Priev ....................... G06F 21/31 726/7 |
| 2018/0039795 | A1 | 2/2018 | Gulati |
| 2018/0183581 | A1* | 6/2018 | Elbaz ....................... G09C 1/00 |
| 2018/0349242 | A1 | 12/2018 | Mathews |
| 2019/0081803 | A1 | 3/2019 | Gulati |

FOREIGN PATENT DOCUMENTS

| | | |
|---|---|---|
| JP | 2001-054092 A | 2/2001 |
| JP | 2014-513484 A | 5/2014 |

OTHER PUBLICATIONS

PCT/IB2021/055491, International Search Report and Written Opinion mailed Sep. 28, 2021.
Translation of CN 107579815A (Year: 2018).
Japan Patent Office, "Notice of Reasons for Refusal," Oct. 1, 2024, 11 Pages, JP Application No. 2022-576020.
German Patent and Trademark Office, "Office Action," Oct. 8, 2024, 13 Pages, DE Application No. 112021002864.2.

* cited by examiner

SECURE PAIRING OF DEVICES

BACKGROUND

The present disclosure relates to securing communications between two or more devices.

Most devices/components are connected to each other by wires or wireless. Most of these connections/links have some sort of security involved. The downfall to the current approach is that the security is implemented via software, and eventually bugs and security holes are found which enables unauthorized access to the device and communications between the devices. Additionally, the device operation/implementation can be reverse engineered by connecting to a device and sending it commands/request and see what the device returns. The software encryption is not able to protect against reverse engineering of the security protocols. Embodiments of the present disclosure are directed to a system and method for securely pairing two devices. A user selects a first device to pair with a second device. The first and second devices have the ability to securely communicate with each other through the use of encrypted communications. An encryption key is written to the first device and then burned into the encryption module on the first device. A corresponding decryption key is written to the second device and then is burned into the decryption module of the second device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to securing communications between two or more devices. While the present disclosure is not necessarily limited to such applications, various aspects of the disclosure may be appreciated through a discussion of various examples using this context.

Most devices and components are connected to each other either by wires or through wireless technologies, such as WiFi, Bluetooth, Infrared, cellular, Near Field Communications (NFC), or other wireless communications protocols. Most of these connections and links have some sort of security involved to prevent the discovery of the security keys. The downfall is that most security is implemented via software, and eventually, bugs and security holes are found. Additionally, the device operation and/or implementation is susceptible to being reverse engineered by connecting to a device and sending it commands or request and observing what the device returns. As such, the software encryption is not able to protect against reverse engineering and obtaining the encryption keys and/or the data itself.

The present disclosure burns in the encryption keys into either side of a connection or link, such that the data in each direction is both encrypted and secure. The present disclosure permanently pairs devices and/or components together. By permanently burning in encryption keys, the data is protected, and the device is useless unless paired with the original device. Bad actors attempting to reverse engineer the device are unable to communicate with the device or components, because the associated encryption is unknown and never transmitted between the two parts. Even if the encryption key is determined for one direction, the connected device is still protected with an encryption in the opposite direction.

This system can be used for secure components on a motherboard such as service processors, memory, voltage regulators, etc. This system can also be used in sensitive applications where it is desirable not to compromise persistent memory (e.g. code & data). Other applications can be applied to wireless security and personal devices.

Figure 1:
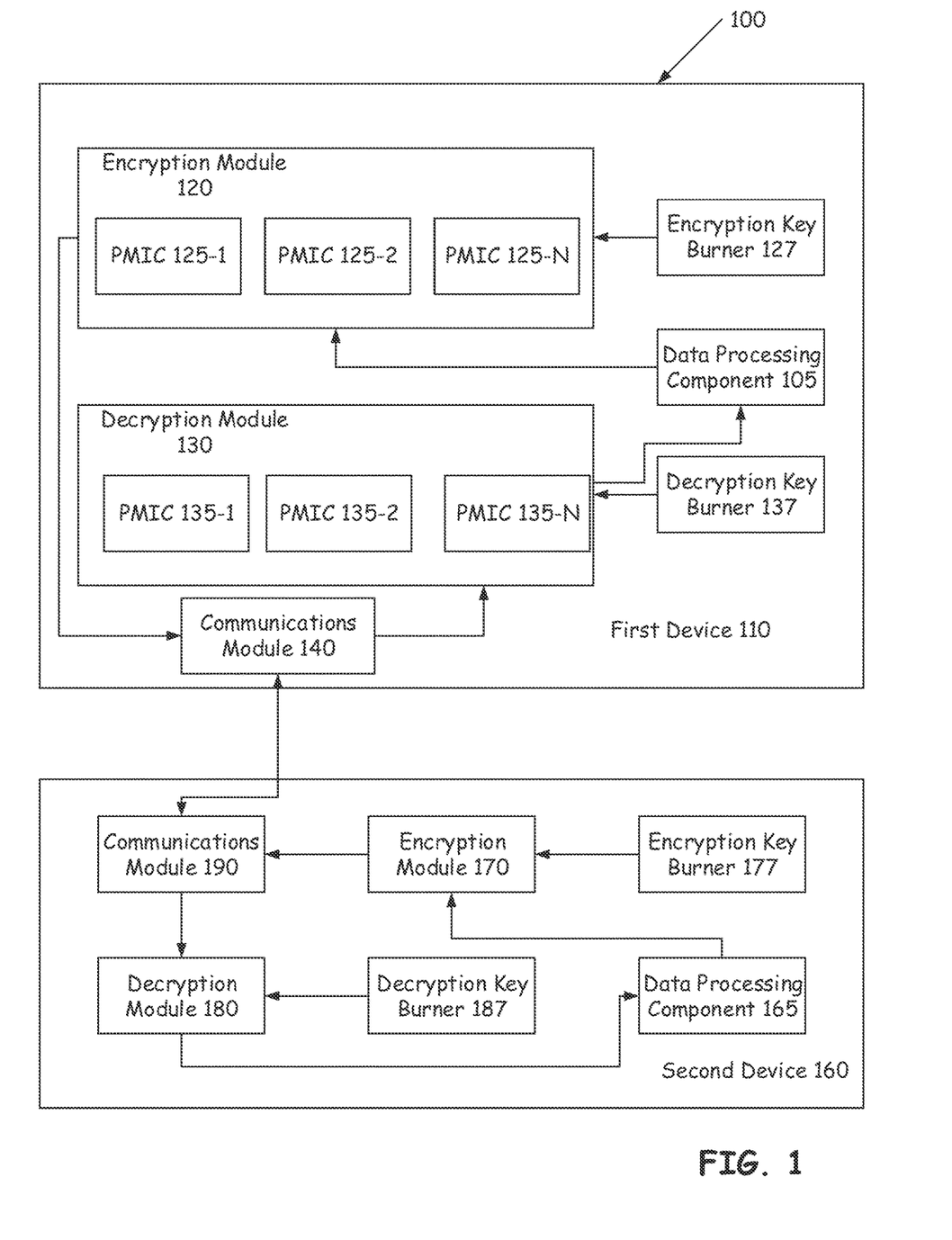
FIG. 1 is a block diagram of a system a secure communication and pairing system according to illustrative embodiments.

FIG. 1 is a block diagram illustrating a secure communication and pairing system 100 according to embodiments of the present disclosure. System includes a first device 110 and a second device 160 that are communicatively coupled to one another such that they can send encrypted data between each other. The first device 110 includes a data processing component 105, an encryption module 120, a decryption module 130, an encryption key burner 127, a decryption key burner 137, and a communications module 140. Similarly, the second device 160 includes a data processing component 165, an encryption module 170, a decryption module 180, an encryption key burner 177, a decryption key burner 187, and a communications module 190. As the first device 110 and the second device 160 include similar components, the present discussion will discuss the various components that are similar together with reference to the first device's components.

The first device 110 is a device that is capable of sending and receiving data to and from another device. The first device 110, can be, for example, a mobile phone, a tablet computing device, a laptop computer, a server, a gaming device, a storage device, or any other device capable of sending and receiving data. The first device 110 sends data to another device by encrypting the data that is sent to that device. Similarly, the second device 160 is a device that is capable of sending and receiving data to and from another device. The second device 160, can be, for example, a mobile phone, a laptop computer, a server, a gaming device, a storage device, or any other device capable of sending and receiving data. The second device 160 sends data to another device by encrypting the data that is sent to that device. The first device 110 and the second device 160 can be the same type of device (e.g. both are mobile phones) or can be different types of devices (e.g. a laptop computer and a server). In some embodiments, the first and second devices are discrete components within a single device. For example, the first device can be a CPU and the second device can be a memory component in the device, and the communications between the two components can be encrypted.

The data processing component 105 is a component of the first device 110 that is configured to process or generate data on the first device 110. The data processing component 105 can include, for example, one or more of, a word processing application, an email application, a data storage system, a photo processing application, an internet browser, or any other application or task that generates or manipulates data on the first device 110. Similarly, the second device 160 includes a data processing component 165 that performs similar manipulations on data. In some embodiments, the data that is generated is data that permits the updating of or modification of the second device 160. This could be useful in situations where an individual wants to control the contents or functionality of the second device 160. For example, a parent can control what is updated on the second device 160 through the use of the encryption/security of the present disclosure. Through this type of pairing of the first device 110 and the second device 160, the holder of the second device 160 would not be able to modify the second device 160 without the approval of the individual holding the first device 110.

The encryption module 120 is a component of the first device 110 that is configured to encrypt data generated or manipulated by the data processing component 105 prior to storing or transmitting the data to another device. The encryption module 120 can implement any type of encryption including symmetric and asymmetric cryptology. In some embodiments, the encryption module 120 uses public key encryption. Public key encryption uses a pair of keys, public keys which can be widely shared, and private keys which are only known by the individual who needs to decrypt the content. Some public key encryption approaches which can be employed by the encryption module 120 include, for example, Rivest-Shamir-Adleman (RSA), Diffie-Hellman, Elliptic-curve Diffie-Hellman (ECDH), Secure Remote Password Protocol (SRP), pre-shared key (PSK), Digital Signature Algorithm (DSA), Elliptic Curve DSA (ECDSA), RC4, Triple data encryption algorithm (Triple DES), Advanced Encryption Standard (AES), International Data Encryption Algorithm (IDEA), Data Encryption Standard (DES), Camellia, Hash-based MD5, and Secure Hash Algorithms (SHA) hash function. However, in some embodiments, unlike a typical public key structure, the public key used to encrypt the data is not made publicly available or otherwise openly shared with others. When data is to be transmitted from the first device 110, it is passed through the encryption module 120 which applies the encryption key and corresponding encryption algorithm to encrypt the data.

The encryption module 120 further includes a number of physically modifiable internal components 125-1, 125-2, . . . 125-N (collectively PMIC 125 or PMICs 125, or PMIC 135, PMICs 135 for the decryption module 130) that holds a binary representation of the public key to be used by the encryption module 120 for encrypting the data. An encryption module 120 with a physically modifiable internal component (PMIC 125) can provide benefits over existing security techniques by ensuring that the encryption key remains secure from possible tampering or exposure. In some embodiments, the PMIC 125 is implemented using an eFuse, which is a technology for the dynamic real-time reprogramming of computer chips. eFuse has the benefit of once a "fuse" is burned, it cannot be restored to its original state. However, in some embodiments PMIC 125 can be an array of e-Fuses or EEPROM through a logic circuit, or an EEPROM gated by an e-Fuse. When gated by an e-Fuse, the gate acts as a prevention mechanism to prevent modification of the data/image located past the e-Fuse gate.

The PMIC 125 of the encryption module 120 is comprised of one or more breakable devices configured to cause an open circuit (e.g., a fuse, a wire, a conductive material with a defined brittleness). Each of the breakable devices may operate through a sacrificial operation, such as breaking. Before being broken, each breakable device is an electronic pathway through which current may flow from one end to another. Electricity can flow through continuously or in response to a request to verify the breakable device. If electricity reaches another end, the circuit is considered closed and the closed circuit may represent a value, such as a "1" or a "0". After being broken, each breakable device is broken such that current may no longer flow from one end to another. For example, the breakable device can be constructed of a fragile nature that severs or vaporizes in response to heat, current, or other relevant cause. If electricity does not reach another end, the circuit is considered open and the open circuit may represent a value, such as a '0' or a '1'. The value represented by an open or closed circuit is the opposite value. That is, for example, if the open circuit has a value of "1" then the closed circuit has a value of "0", and vice versa. The process of breaking the circuit can be performed by, for example, vaporizing, melting, burning, blowing, rupturing, physically modifying, or otherwise disrupting the flow of current through the particular circuit. Each of the breakable devices can operate by receiving an electrical current that causes the creation of the open circuit (e.g., an overcurrent, an excessive load).

The PMIC 125 can effectuate operation directly. In some embodiments, the PMIC 125 can include logic that reads the number of breakable devices and their current state. In some embodiments, the logic is not included in the PMIC 125. For example, the logic can be located within a computer housing the PMIC 125. In another example, the logic can be in a second integrated circuit and can be communicatively coupled to the PMIC 125 through logical traces of a circuit board or through a communication cable or other wire. In some embodiments, the PMIC 125 can apply a current directly to the breakable device. In some embodiments, the PMIC 125 can apply a current indirectly to a breakable device and applying a second current directly to the breakable device. In a first example, a first current is applied to a wire adjacent to a plurality of breakable devices causing the breakable devices to increase in temperature (e.g., heating). After heating, a second current is applied directly to one or more of the plurality of breakable devices causing one or more breakable devices to break, and consequently, creating one or more permanently open circuits. In some embodiments the current applied to the breakable devices in the PMIC 125 to cause the break is provided by an outside source. In this embodiment, the PMIC 125 does not have the internal ability to break any of the breakable devices. In this way the pattern of the breakable devices cannot easily be changed once the encryption module 120 is programmed.

The encryption key burner 127 is a component of the first device 110 that burns in the encryption key into the encryption module 120. The encryption key is burned into the encryption module 120 using the PMIC 125 portions of the encryption module 120. The encryption key value is converted to a binary value. This binary value is then burned in by changing the broken/unbroken status of a number of the PMIC 125 such that the corresponding value represents the encryption key value. For example, if the encryption key value is "6EB957008E03CE4" is converted to a 64 bit binary value of:

00000110 11101011 10010101 01110000 00001000 11100000 00111100 11100100

To burn this value into the encryption module 120, the encryption module 120 needs to have to have at least 64 PMICs 125 available. The encryption key burner 127 then, depending on the method used for determining a "0" or a "1", burns the corresponding circuit to either open the circuit or close the circuit. However, the encryption module 120 can have any number of PMICs 125 such that not all of the available PMICs 125 are used for the encryption key. Further, the encryption key value can be any number of bits. However, the encryption module 120 should have at least the number of PMICs 125 as the number of bits in the encryption key. Further, if the first device 110 is to be paired with other devices additional PMICs 125 will be required to store the corresponding encryption keys for the additional devices.

The decryption module 130 is a component of the second device 160 that is configured to decrypt data received from the first device 110 that has been encrypted. The decryption module 130 applies the decryption key to the received data to decrypt the data. The process of decryption can be done using any method for decrypting data. Once the data has been decrypted by the decryption module 130, it can be viewed or otherwise used on the second device 160. In the instance, where the first device 110 controls actions on the second device 160, the decryption of the data permits the second device 160 to modify itself according to the instructions contained in the data.

The decryption key burner 137 is a component of the first device 110 that burns in the decryption key into the decryption module 130. The decryption key is burned into the decryption module 130 using the PMIC 135 portions of the decryption module 130. The decryption key value is converted to a binary value. This binary value is then burned in by changing the broken/unbroken status of a number of the PMIC 135 such that the corresponding value represents the decryption key value. For example, if the decryption key value is "6EB957008E03CE4" is converted to a 64 bit binary value of:

00000110 11101011 10010101 01110000 00001000 11100000 00111100 11100100

While the present description illustrates the same key value used for the encryption key and the decryption key, it should be recognized that in asymmetrical encryption the encryption key and the decryption key do not share the same value.

To burn this value into the decryption module 130, the decryption module 130 needs to have to have at least 64 PMICs 135 available. The decryption key burner 137 then, depending on the method used for determining a "0" or a "1", burns the corresponding circuit to either open the circuit or close the circuit. However, the encryption module 120 can have any number of PMICs 135 such that not all of the available PMICs 135 are used for the decryption key. Further, the decryption key value can be any number of bits. However, the decryption module 130 should have at least the number of PMICs 135 as the number of bits in the decryption key. Further, if the first device 110 is to be paired with other devices additional PMICs 135 will be required to store the corresponding decryption keys for the additional devices.

The communications module 140 is a component of the first device 110 and the second device 160 that permits the first device 110 and the second device 160 to communicate with each other. The communications module 140 can use any technology or approach to transmit or receive data. In some embodiments the communications module 140 is a transceiver. However, in other embodiments, the communications module 140 can employ network communications technologies, such as ethernet, Wi-Fi, cellular technologies (e.g. GSM, CDMA, LTE, 3G, 4G, 5G, etc), etc. The communications module 140 transmits and/or receives the encrypted data that is generated by either the first device 110 or the second device 160, respectively.

Figure 2:
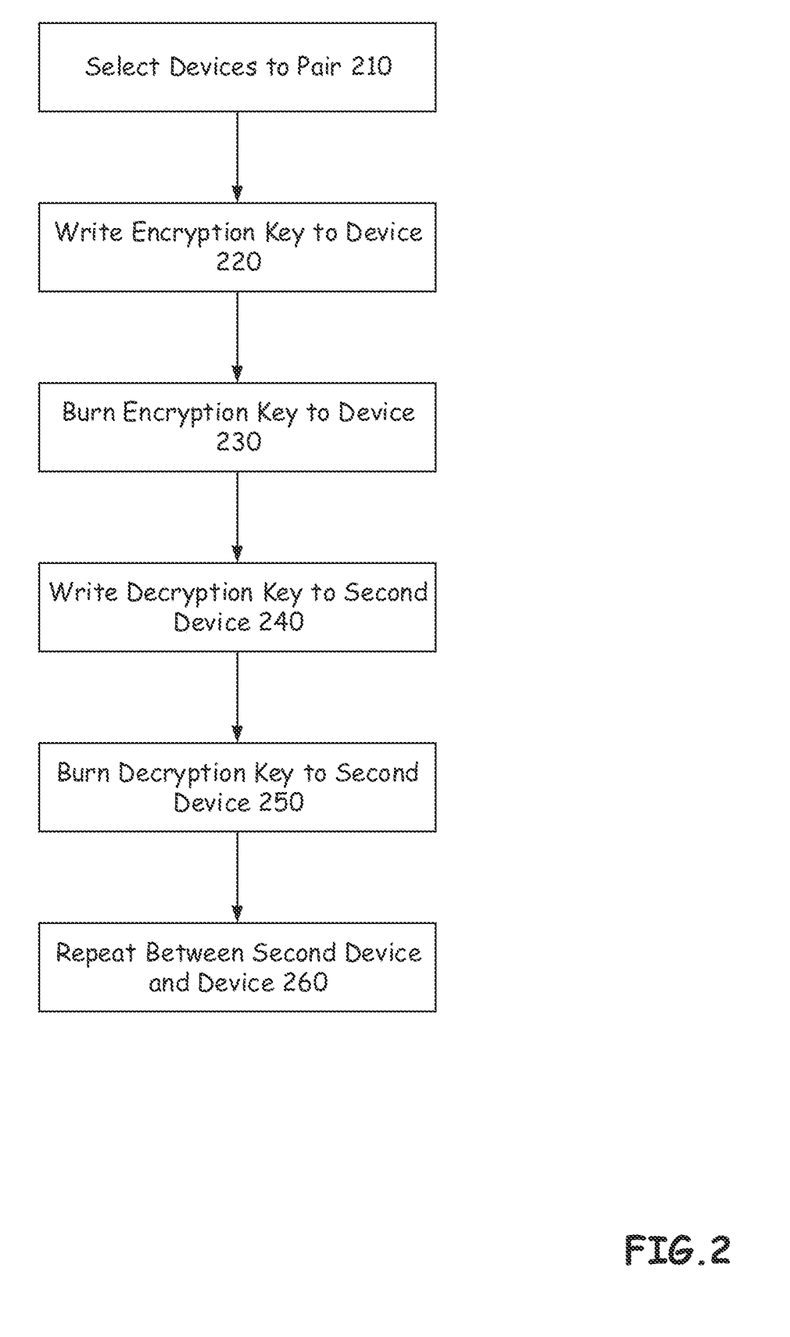
FIG. 2 is a flow diagram illustrating a process for creating a secure pairing between two or more devices according to illustrative embodiments.

FIG. 2 is a flow diagram illustrating a process for creating a secure pairing between two or more devices according to embodiments. The process begins when a user or other individual selects the first two devices to be paired with each other. This is illustrated at step 210. Once the devices have been selected, an encryption key is selected for the first device 110. In some embodiments the encryption key can be any type of encryption key including symmetric and asymmetric cryptology.

Once the encryption key has been selected the system proceeds to write the encryption key to the first device 110. This illustrated at step 220. To write the encryption key to the first device 110, the encryption key burner 127 receives the encryption key value and then determines what PMICs 125 of the first device 110 need to be broken. In this way the encryption key burner 127 determines which PMICs 125 should have their corresponding value changed. Depending on how the system determines what a "0" or a "1" is will determine which particular PMICs 125 need to be broken.

After the encryption key has been written to the first device 110, the system proceeds to burn in the encryption key into the PMICs 125. This is illustrated at step 230. To write the encryption key to the first device 110 the encryption key burner 127 breaks the corresponding PMICs 125 such that a corresponding value of "1" or a "0" is created. The process of breaking the circuit can be performed by, for example, vaporizing, melting, burning, blowing, rupturing, physically modifying, or otherwise disrupting the flow of current through the particular circuit. Each of the PMICs 125 can operate by receiving an electrical current that causes the creation of the open circuit (e.g., an overcurrent, an excessive load).

On the second device 160, the system proceeds to write the corresponding decryption key to the second device 160. This illustrated at step 240. To write the decryption key to the first device 110, the decryption key burner 137 receives the encryption key value and then determines what PMICs 135 of the second device 160 need to be broken. In this way the decryption key burner 137 determines which PMICs 135 should have their corresponding value changed. Depending on how the system determines what a "0" or a "1" is will determine which particular PMICs 135 need to be broken.

After the decryption key has been written to the second device 160, the system proceeds to burn in the decryption key into the PMICs 135. This is illustrated at step 250. To write the decryption key to the first device 110 the decryption key burner 137 breaks the corresponding PMICs 135 such that a corresponding value of "1" or a "0" is created. The process of breaking the circuit can be performed by, for example, vaporizing, melting, burning, blowing, rupturing, physically modifying, or otherwise disrupting the flow of current through the particular circuit. Each of the PMICs 135 can operate by receiving an electrical current that causes the creation of the open circuit (e.g., an overcurrent, an excessive load).

The system then proceeds by repeating steps 210-250 on the first device 110 and the second device 160. This is illustrated at step 260. However, instead of writing the encryption key to the first device 110 and the decryption key to the second device 160, the system selects a second encryption key and corresponding second decryption key and writes the second encryption key to the second device 160 and the second decryption key to the first device 110. In some embodiments the second encryption key and second decryption key are different from the encryption key that was written to the first device 110 and the decryption key that was written to the second device 160.

Figure 3:
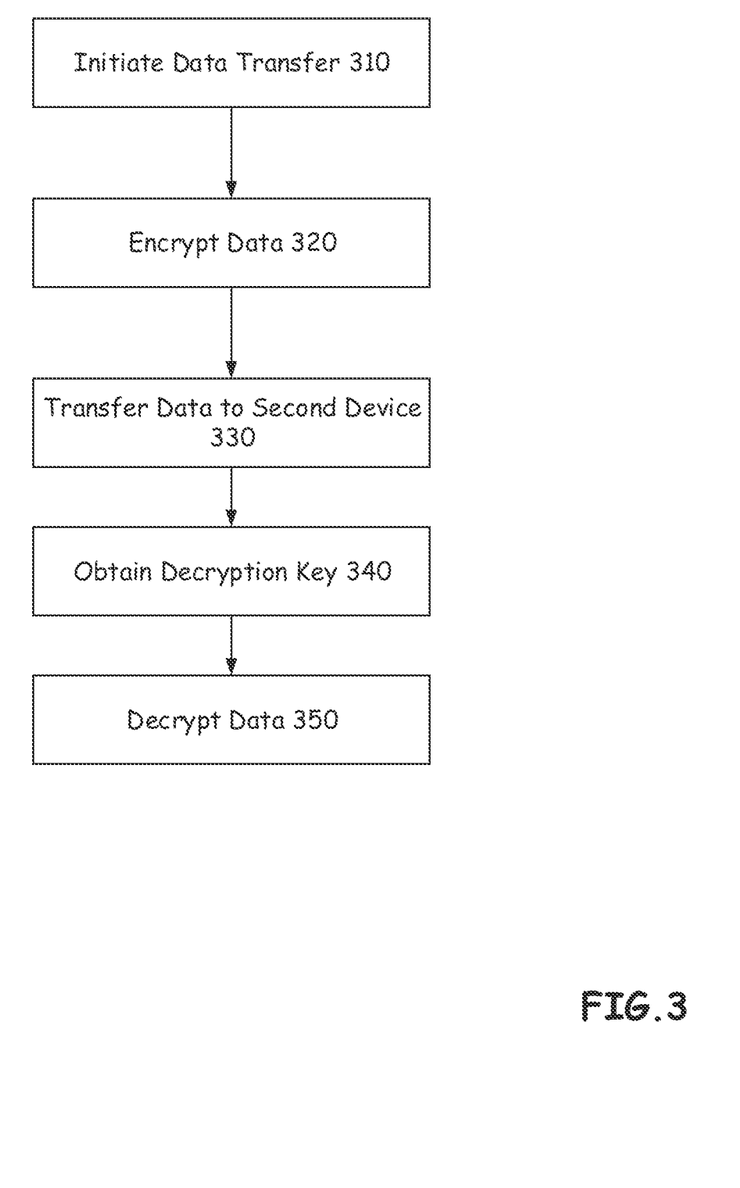
FIG. 3 is a flow diagram illustrating a process of how the system operates during a data transfer according to illustrative embodiments.

FIG. 3 is a flow diagram illustrating a process for transmitting data from the first device 110 to the second device 160 according to embodiments. It should be noted that the process discussed here with respect to FIG. 3 is equally applicable when the second device 160 transmits data to the first device 110, or any transfer between two devices implementing the encryption/decryption process of the present disclosure. The process begins by the user or an application of the first device 110 initiating a transfer from the first device 110 to the second device 160. This is illustrated at step 310. The initiation of the transfer can occur using the normal processes that the application or user uses to transfer data.

Following the initiation of the data transfer, the data is passed to the encryption module 120 for encryption of the data. This is illustrated at step 320. The encryption module 120 takes the data and encrypts the data according the process that has been programed into the encryption module 120. To obtain the encryption key to use for the encryption, the encryption module 120 accesses the encryption key that has been burned into the encryption module 120 for transmitting data to the second device 160. If the first device 110 is paired with multiple different devices, the first device 110 can use a table or other identifier to determine which bits in the PMICs 125 represent the encryption key that is to be used to send data to the second device 160. In some embodiments, some of the PMICs 125 can be used to hold an identifier for the encryption key. In this embodiment the encryption module 120 will search the PMICs 125 to find an identifier that indicates that the encryption key is for data to be sent to the second device 160. To enable the ability to find this information, the encryption module 120 can assign each encryption key additional bits to permit the device identifier to be placed before or after the corresponding encryption key. It should be noted that in this embodiment the number of bits assigned to each encryption key and identifier should be the same for all devices. When a device uses a smaller number of bits for its encryption key, the encryption burner can fill in the preceding bits with an indication of "0" to allow the corresponding encryption key to have the "same" number of bits. This allows the module to know that "x" bits represent the key and "y" bits represent the identifier.

Once the data has been encrypted it is transmitted to the second device 160. This is illustrated at step 330. The process of sending the data to the second device 160 can use any method for sending data between two devices. This data is received by the second device 160 who can then proceed the process of decrypting the data. The process of decryption begins when the decryption module 130 obtains the decryption key needed to decrypt the data from the first device 110. This is illustrated at step 340. To obtain the decryption key to use for the decryption, the decryption module 130 accesses the decryption key that has been burned into the decryption module 130 for decrypting data received from the first device 110. If the second device 160 is paired with multiple different devices, the second device 160 can use a table or other identifier to determine which bits in the PMICs 125 represent the decryption key that is to be used to decrypt data received from the first device 110. In some embodiments, some of the PMICs 125 can be used to hold an identifier for the decryption key. In this embodiment the decryption module 130 will search the PMICs 125 to find an identifier that indicates that the decryption key is for data to be received from the second device 160. To enable the ability to find this information, the decryption module 130 can assign each decryption key additional bits to permit a device identifier to be placed before or after the corresponding decryption key. It should be noted that in this embodiment the number of bits assigned to each decryption key and identifier should be the same for all devices. When a device uses a smaller number of bits for its decryption key, the decryption burner can fill in the preceding bits with an indication of "0" to allow the corresponding decryption key to have the "same" number of bits.

To decrypt the data, the data is passed to the decryption module 130, which takes the data and decrypts the data according the process that has been programed into the decryption module 130. This is illustrated at step 350. Any process for decrypting the data can be used. Once the data is decrypted, the user or application on the second device 160 can use the data to perform whatever action or modification is desired based on the data.

Figure 4:
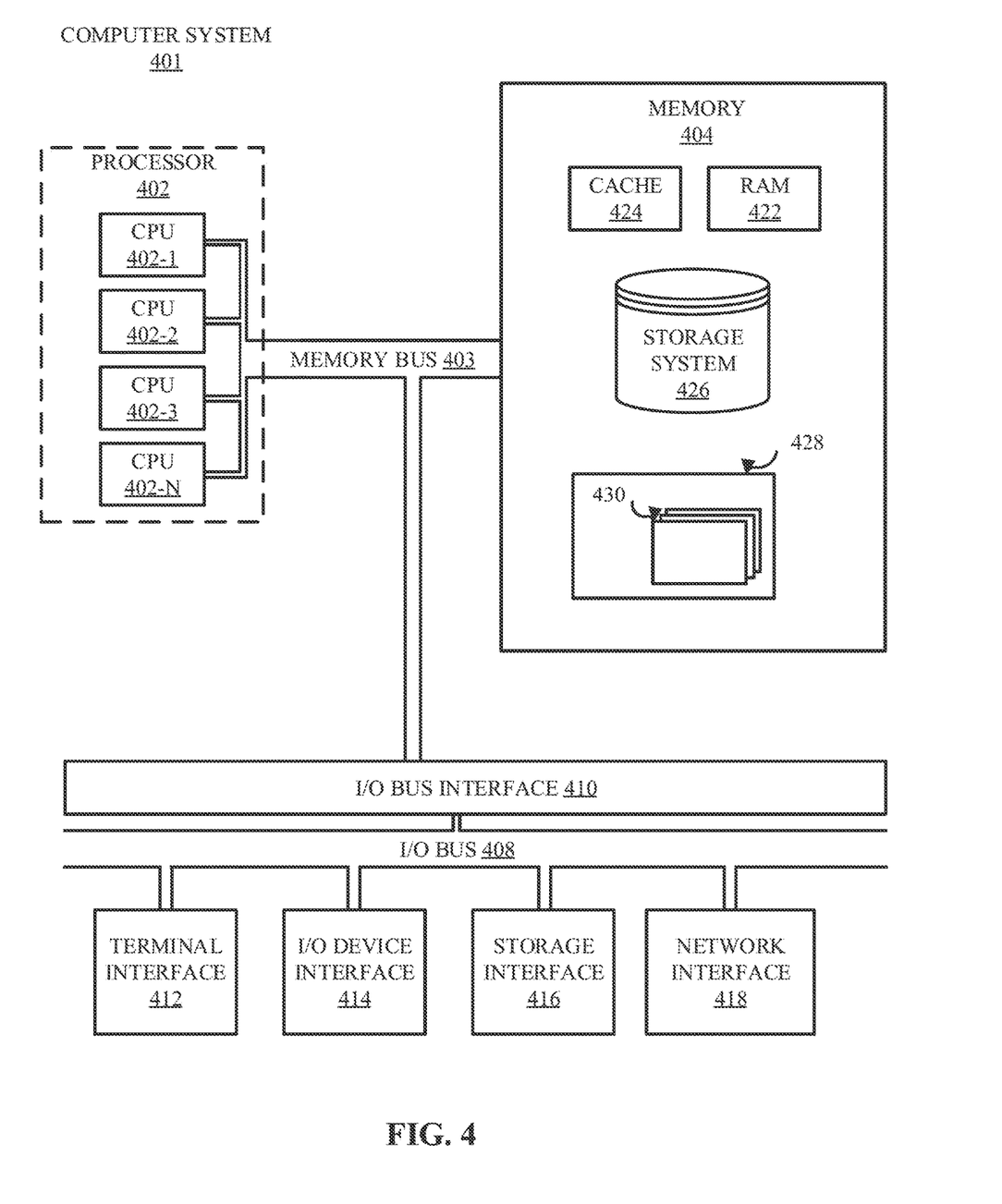
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, and 402-N, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 403 generally perform the functions or methodologies of various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for securely pairing devices, the method comprising:

burning a first encryption key into an encryption module on a first device, the first encryption key corresponding to a first decryption key, the first decryption key burned into a second device, the first device configured to encrypt communication to the second device using the first encryption key burned into the encryption module; and burning a second decryption key into a decryption module on the first device, the second decryption key corresponding to a second encryption key burned into the second device, the first device configured to decrypt communication from the second device using the second encryption key burned into the decryption module, wherein the first encryption key is different from the second encryption key, and wherein the first decryption key is different from the second decryption key.

2. The method of claim 1 wherein the first encryption key is burned into a plurality of physically modifiable internal components (PMICs) in the encryption module.

3. The method of claim 2 wherein the first encryption key is burned into the plurality of PMICs as a binary representation of the encryption key.

4. The method of claim 1 further comprising:

burning a third encryption key into the encryption module on the first device, the third encryption key corresponding to a third decryption key burned into a third device.

5. The method of claim 1 wherein the second decryption key is burned into a plurality of physically modifiable internal components (PMICs) in the decryption module.

6. The method of claim 5 wherein the second decryption key is burned into the plurality of PMICs as a binary representation of the decryption key.

7. The method of claim 1 wherein the first encryption key and first decryption key are a public key encryption pair.

8. The method of claim 1 further comprising:

burning a third decryption key into the decryption module on the first device, the third decryption key corresponding to a third encryption key burned into a third device.

9. A system for securely pairing devices, the system comprising:

a first device, comprising:

an encryption module configured to encrypt data prior to transmission to a second device using a first encryption key burned into the encryption module, the first encryption key corresponding to a first decryption key burned into a second device;

an encryption burner configured to burn the first encryption key into the encryption module;

a decryption module configured to decrypt data received from the second device using a second decryption key burned into the decryption module, the second decryption key corresponding to a second encryption key burned into the second device; and a decryption burner configured to burn the second decryption key into the decryption module, wherein the first encryption key is different from the second encryption key, wherein the first decryption key is different from the second decryption key.

10. The system of claim 9, wherein the encryption module configured to encrypt data prior to transmission to a third device using a third encryption key burned into the encryption module.

11. The system of claim 9 wherein the first encryption key is burned into a plurality of physically modifiable internal components (PMICs) in the encryption module.

12. The system of claim 11 wherein the first encryption key is burned into the plurality of PMICs as a binary representation of the encryption key.

13. The system of claim 9 wherein the second decryption key is burned into a plurality of physically modifiable internal components (PMICs) in the decryption module.

14. The system of claim 13 wherein the second decryption key is burned into the plurality of PMICs as a binary representation of the decryption key.

15. A computer readable storage medium having computer readable instructions for securely pairing devices that when executed by at least one processor cause the at least one processor to perform a method comprising:
burning a first encryption key into an encryption module on a first device, the first encryption key corresponding to a first decryption key, the first decryption key burned into a second device, the first device configured to encrypt communication to the second device using the first encryption key burned into the encryption module; and
burning a second decryption key into a decryption module on the first device, the second decryption key corresponding to a second encryption key burned into the second device, the first device configured to decrypt communication from the second device using the second encryption key burned into the decryption module, wherein the first encryption key is different from the second encryption key, and wherein the first decryption key is different from the second decryption key.

16. The computer readable storage medium of claim 15, wherein the method further comprises:
burning a third encryption key into the encryption module on the first device, the third encryption key corresponding to a third decryption key burned into a third device.

17. The computer readable storage medium of claim 15, wherein the method further comprises:
burning a third decryption key into the decryption module on the first device, the third decryption key corresponding to a third encryption key burned into a third device.

18. The computer readable storage medium of claim 15, wherein the first device and the second device are mobile computing devices communicating over a public network.

* * * * *